United States Patent [19]
Meric

[11] 3,834,818
[45] Sept. 10, 1974

[54] CONTINUOUS MEASUREMENT OF THE FINENESS OF A PULVERULENT MATERIAL

[75] Inventor: Jean Paul Meric, Paris, France

[73] Assignee: Centre D'Etudes Et De Recherches De L'Industrie Des Liants Hydrauliques, Paris, France

[22] Filed: Mar. 26, 1973

[21] Appl. No.: 345,199

[30] Foreign Application Priority Data
Mar. 29, 1972 France .............................. 72.11018

[52] U.S. Cl..................... 356/102, 356/36, 356/104
[51] Int. Cl.... G01n 15/02, G01n 21/00, G01n 1/00
[58] Field of Search ............. 356/36, 102, 104, 207; 250/218

[56] References Cited
UNITED STATES PATENTS

| | | | |
|---|---|---|---|
| 2,732,753 | 1/1956 | O'Konski | 250/218 |
| 2,816,479 | 12/1957 | Sloan | 356/104 |
| 3,328,587 | 6/1967 | Brown et al. | 356/104 |
| 3,462,608 | 8/1969 | Weston et al. | 250/218 |
| 3,467,471 | 9/1969 | Greenfield | 356/36 |
| 3,705,771 | 12/1972 | Friedman et al. | 356/104 |

Primary Examiner—Vincent P. McGraw
Attorney, Agent, or Firm—Eric H. Waters

[57] ABSTRACT

In order to measure the degree of fineness of a pulverulent material, the pulverulent material is placed in suspension in a gaseous fluid and a converging laser beam from an optical source is passed through the fluid. The luminous flux of the diffracted light is measured by two or more photoelectric cells in the focal plane of the optical system, the cells being at different distances from the optical axis. The fineness of the material is calculated on the basis of the result of these measurements.

13 Claims, 6 Drawing Figures

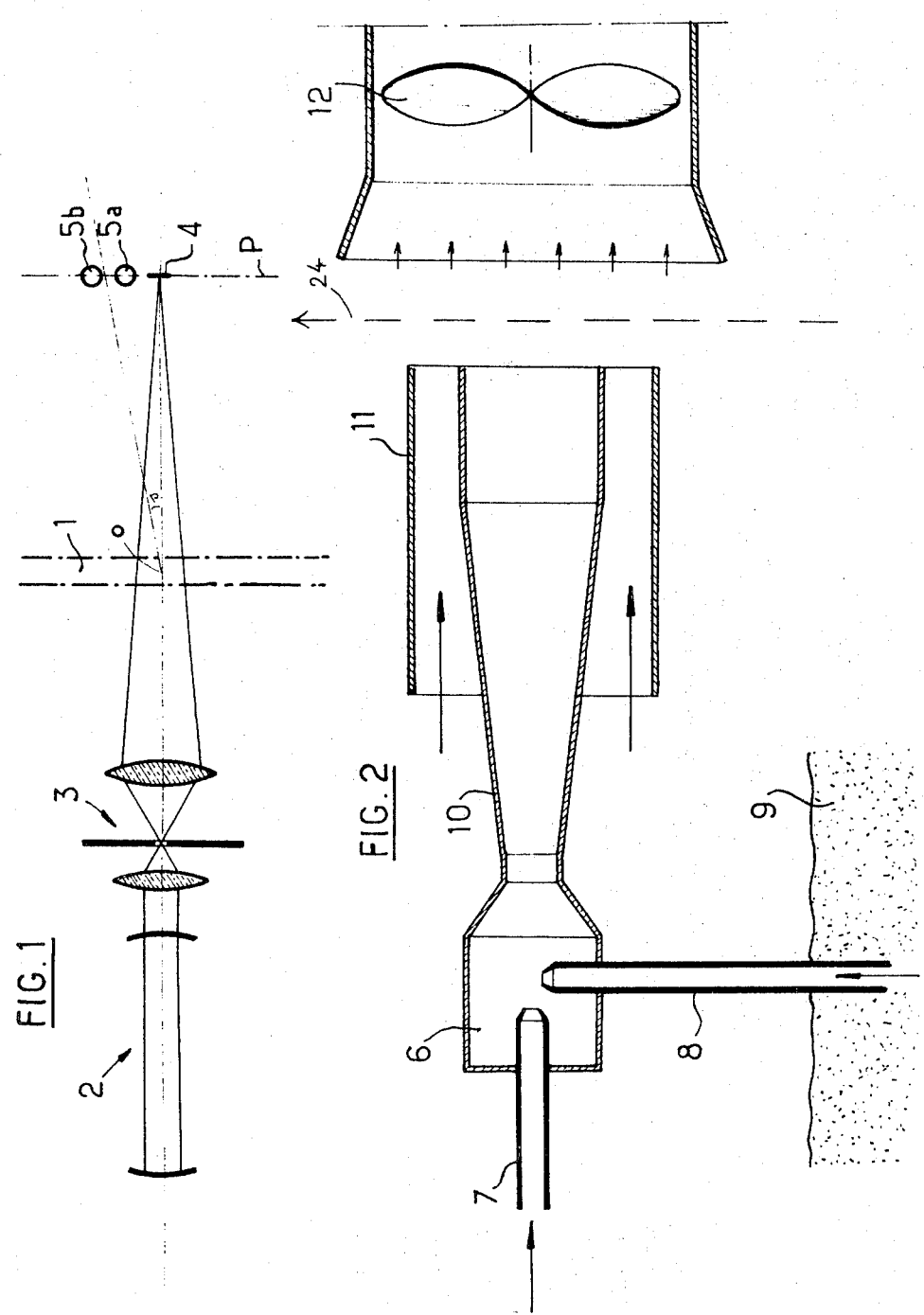

CONTINUOUS MEASUREMENT OF THE FINENESS OF A PULVERULENT MATERIAL

It is known to determine the granulometry of a pulverulent material by forming in the focal plane of an optical system the diffraction spot of a sample of the material illuminated by a laser beam, and measuring the luminous flux of $n$ coronas concentric with this diffraction spot.

This method allows very exact determination of the granulometry of the pulverulent material, but it is relatively complicated in that it requires the solving of $n$ linear equations with $n$ unknowns and may not be operated continuously unless a computer is used.

The object of the present invention is to provide a method which facilitates determination of the fineness of a pulverulent material, but which is simpler and more easily operated on a continuous basis.

In the method according to the present invention the pulverulent material is placed in suspension in a gaseous fluid, a converging laser beam issuing from an optical system is passed through this fluid, the diffracted light is measured at at least two points situated in the focal plane of the optical system, outside the source of light of the system, and at different distances from this source of light, and the fineness is calculated on the basis of the result of these measurements.

When the fluid does not contain powder the diffracted light received at the two points is very weak. On the other hand, if it contains powder, the luminous fluxes measured are due to diffracted light. If the powder is fine (compared with the wavelength) the flux is greater at the point more remote from the optical axis, whereas if the powder is coarse the flux is greater at the point nearer to the axis. Tests show that the ratio of the two measurements depends neither on the intensity of the laser nor on the concentration of the powder in the gas. This ratio depends solely on the fineness of the powder and is thus representative of the fineness.

To express it more precisely, the measurement $S_1$ obtained at the point more remote from the axis is a function of the proportion of material whose particles have a diameter less than a certain value $d_1$. On the other hand, whatever the diameter of the particles, a certain proportion of the light is diffracted at the point nearer to the axis to give a measurement $S_2$; but by far the greatest part of this light is due to particles with diameter exceeding a certain value $d_2$. The ratio $S_1 (S_1 + S_2)$ thus represents the proportion of particles in the material which has a diameter smaller than a value $d$ lying between $d_1$ and $d_2$; it is thus possible to determine a point on the granulometric division curve. In practice, as these measurements are relative, one may be content with taking the value $S_1/S_2$.

The diffracted light may be measured at three points to give three measurements $S_1$, $S_2$, $S_3$. The two ratios $S_1 (S_2 + S_3)$ and $S_3(S_1 + S_2)$ then make it possible to determine two points on the granulometric division curve.

More generally it is possible to measure the diffracted light at two or more points so as to obtain a series of measurements $S_1, S_2 \ldots S_n$ and to apply a formula such as $$\text{fineness} = (a_1 S_1 + a_2 S_2 + \ldots a_n S_n / b_1 S_1 + b_2 S_2 + \ldots b_n S_n)$$

the various coefficients being determined by calculation or experiment. This calculation may be carried out with the help of an analog or digital circuit and the result may be shown directly.

The present invention also provides apparatus for carrying out the method described above.

This apparatus comprises means for placing the pulverulent material in suspension in a gaseous fluid, means for generating a laser beam, an optical system concentrating the laser beam and disposed in such a way that this converging beam passes through the liquid, and at least two photoelectric cells disposed in the focal plane of the optical system, outside the source of light of this system and at different distances from this source of light.

The distances of the cells from the optical axis may, in principle, be whatever is desired. However, they depend on the point on the granulometric curve by which it is desired to characterize the fineness. The half-angle $s$ at the apex of the cone of diffracted light due to particles with a diameter $d$ expressed in $\mu m$ is given by $s = 0.8/d$ radians.

In order to express the fineness as the proportion of particles of the material having a diameter less than $d$, it is sufficient to place one cell inside a cone with $s$ for the half-angle at the apex and the second cell outside this cone. In the case of cement it is preferable to choose for $d$ a value lower than 10 $\mu m$, for example 8 $\mu m$, in which case the value of $s$ is 0.1 radian.

The invention will be described further by way of example only, with reference to the accompanying drawings, in which:

FIG. 1 is a diagrammatic representation of apparatus for determining the fineness of a pulverulent material;

FIG. 2 is a diagrammatic vertical section through a device used to place the pulverulent material in suspension;

Figure 3:
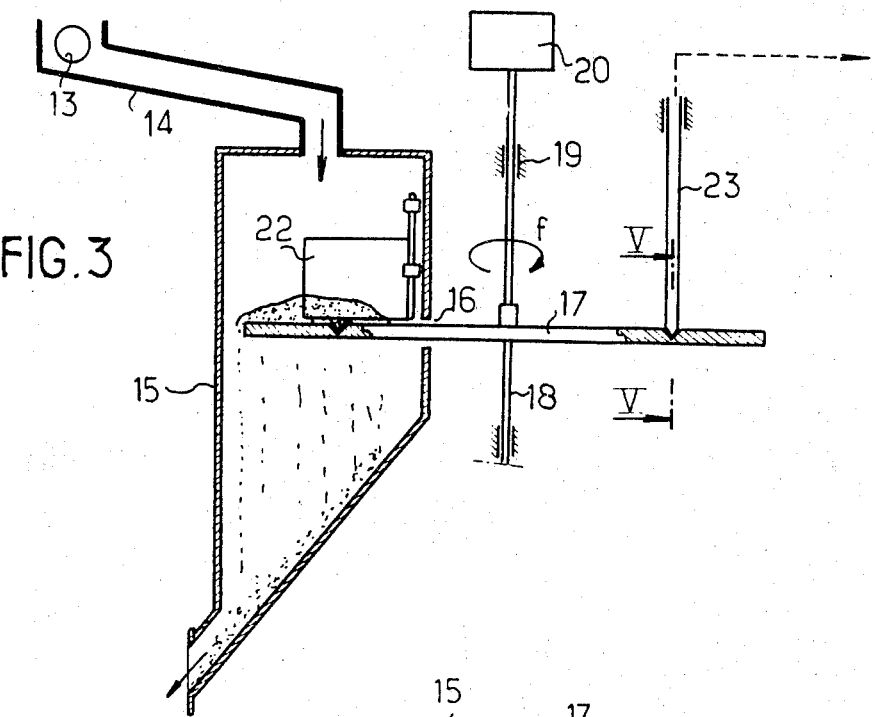
FIG. 3 shows vertical section an arrangement for supplying pulverulent material to the device of FIG. 2.
Figure 4:
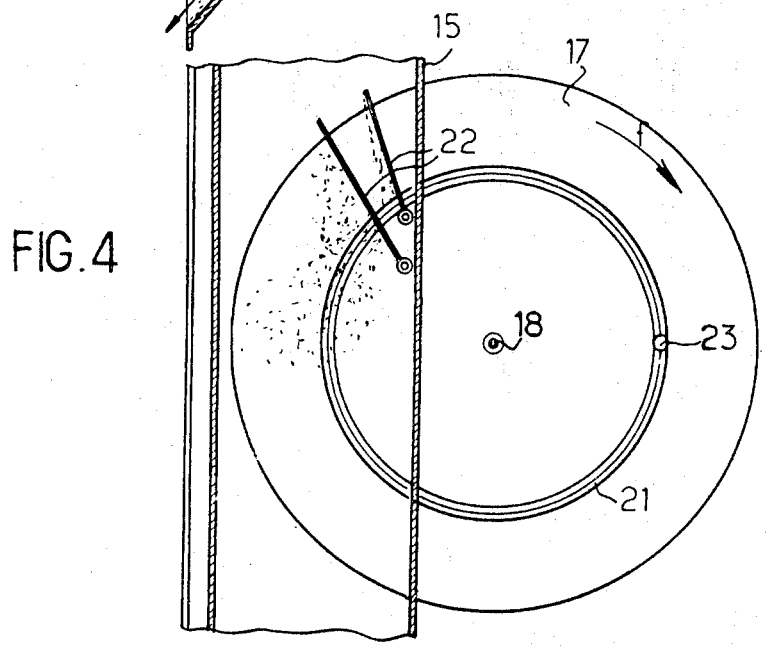
FIG. 4 is a horizontal sectional view of the arrangement of FIG. 3.
Figure 5:
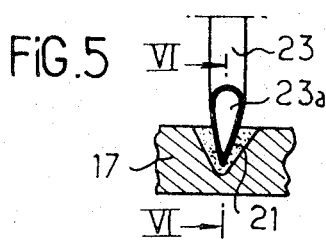
FIG. 5 is a sectional view along line V—V of FIG. 3.
Figure 6:
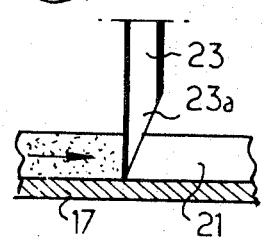
FIG. 6 is a sectional view along line VI—VI of FIG. 5, the groove being shown developed.

With reference to FIG. 1, a gaseous jet 1, contains in suspension a pulverulent material whose fineness is to be determined. The apparatus used for this purpose comprises a laser 2 in front of which is placed a spatial filter 3. This filter purifies the beam by suppressing the non-parallel rays, broadens it, directs it through the jet 1, and focusses it at a point where a diffuser 4, constituted for example by a small point or a black cone, is disposed. In the plane P of this diffuser, in other words in the focal plane of the spatial filter 3, are disposed a series of photoelectric cells, which in this case number two, 5a and 5b, but the number may be greater. Of these two cells, one cell 5a is placed in the inside of the diffraction cone having an apex 0 in the jet 1 and a half-angle $s$ at the apex $s$ equal to 0.1 radian, and the other cell 5b is outside this cone.

Each of these cells supplies a signal $S_1$ or $S_2$ and the fineness is given by the ratio of $S_1/S_2$.

In order to place the pulverulent material in suspension, the device shown in FIG. 2 may be used. This device comprises a duct or chamber 6 into which extend a compressed air inlet conduit 7 and a conduit 8 whose lower end is immersed in a fluidized bed 9 of the pulverulent material, for example, cement.

A convergent-divergent nozzle 10 is disposed at the output of the duct or chamber 6 and is surrounded by a tube 11 forming a passage for secondary air discharging at the end of the nozzle 10. A blower 12 is placed in front of this convergent-divergent nozzle 10. The laser beam passes between the tube 11 and the blower 12, as is shown diagrammatically by the arrow 24.

In operation, the pulverulent material is drawn into the duct or chamber 6 through the conduit 8. Here the material passes across a series of stationary supersonic shockwaves which are produced by the convergent-divergent nozzle 10, the effect of these being to disperse and deflocculate the material. At the outlet of the nozzle, the material is in the form of a homogeneous suspension delimited by the flux of clean secondary air. This flux is used to prevent the powder laden jet bursting and makes it possible to localize this jet very precisely.

The blower 12 evacuates the suspension which has just passed across the laser beam issuing from the spatial filter 3.

Instead of taking samples of the pulverulent material directly from a receptacle containing a fluidized bed of material, it is also possible to proceed as is shown in FIGS. 3 to 6.

A sampling element 13, consisting of, for example, a motorized screw or a pneumatic guide channel, transfers into an inclined conduit 14 a small fraction of the pulverulent material. This conduit 14 discharges into a funnel 15 provided with a slot 16 through which a disc 17 projects. This disc is fixed on a vertical axle 18, which is supported by bearings 19 and is connected to the output shaft of a motor 20 (if necessary via a speed reduction means), so that the disc 17 rotates in the direction shown by the arrow *f*.

The disc 17 has an annular groove 21 which has a triangular section and a rounded bottom, and the funnel 15 contains scrapers 22 (or a single scraper) arranged in such a way that they level the material in the groove, prevent the material contained in the funnel from escaping through the slot 16, and discharge the material over the edge of the disc.

A hollow needle 23, whose extremity **23*a* is shaped as a bevel, is introduced into the groove 21 so that its bevel is turned forwards, i.e., it faces in the direction of rotation of the disc 17. This needle is connected to the conduit 8 (FIG. 2**).

In operation, the pulverulent material introduced into the funnel 15 drops onto the disc 17 and fills the groove 21. The material is smoothed by the scrapers 22, so that the groove is full when it emerges from the funnel. The excess material drops from the disc into the bottom of the funnel 15 where it is evacuated.

The needle 23 ploughs along the groove 21 and sucks up the material contained in the groove, under the action of the reduced pressure created in the conduit 8, through which it then passes. The bevelled shape of the extremity **23*a* of the needle, and the fact that the bevel is directed forwards, ensure regular feeding of the needle and prevent the material being sucked up in jerks. The groove 21** is completely emptied thanks to its triangular shape.

I claim:

1. A method of determining the fineness of a pulverulent material, comprising: placing the pulverulent material in suspension in a gaseous fluid; passing through the fluid a converging laser beam issuing from an optical system, the beam being diffracted by the material; measuring the luminous flux of the diffracted light at at least two points situated in the focal plane of the optical system, outside the focus of the beam, and at different distances from this focus; and calculating the fineness of the material from the result of these measurements.

2. A method as claimed in claim 1, in which one of the said points lies inside a diffraction cone whose half-angle at the apex is $0.8/d$ radian, $d$ being the material particle diameter selected to characterize the fineness of the material, another of the said points lying outside the said cone.

3. A method as claimed in claim 2, in which the said half-angle is 0.1 radian.

4. Apparatus for determining the fineness of a pulverulent material, comprising means for placing the pulverulent material in suspension in a gaseous fluid, a laser for generating a laser beam, an optical system arranged to cause the laser beam to converge and for the convergent beam to pass through the suspension of pulverulent material in the gaseous fluid, and at least two photoelectric cells disposed in the focal plane of the optical system, outside the focus of the beam and at different distances from this focus.

5. Apparatus as claimed in claim 4, in which one of the cells is disposed inside a diffraction cone whose half-angle at the apex is $0.8/d$ radian, $d$ being the material particle diameter selected to characterize the fineness of the material, another of the cells being disposed outside the said cone.

6. Apparatus as claimed in claim 5, in which the said cone has a half-angle at the apex of 0.1 radian.

7. Apparatus as claimed in claim 4, in which the means for placing the pulverulent material in suspension comprises a compressed air duct having an inlet for the material, and a convergent-divergent nozzle at the outlet of the duct.

8. Apparatus as claimed in claim 7, in which the nozzle is surrounded by a secondary air inlet conduit discharging at the extremity of the nozzle.

9. Apparatus as claimed in claim 7, in which the means for placing the pulverulent material in suspension further comprises a disc having an annular groove, means for rotating the disc, means for supplying the pulverulent material onto the disc so that it fills the groove, and a hollow needle, one end of which extends into the groove whereas its other end is connected to the material inlet of the compressed air duct.

10. Apparatus as claimed in claim 9, in which the groove has a triangular cross-section with a rounded bottom.

11. Apparatus as claimed in claim 9, in which the end of the needle in the groove is provided with a bevel facing in the direction of rotation of the disc.

12. Apparatus as claimed in claim 9, in which the means for supplying the pulverulent material comprises a funnel whose wall has a slot through which the disc projects into the funnel.

13. Apparatus as claimed in claim 9, further comprising at least one scraper arranged to level the material in the groove.

* * * * *